US010027655B2

(12) United States Patent
Wan et al.

(10) Patent No.: US 10,027,655 B2
(45) Date of Patent: Jul. 17, 2018

(54) METHOD AND SYSTEM FOR CU LOGGING IN DOCKING PLATFORM

(71) Applicant: ZTE Corporation, Shenzhen, Guangdong Province (CN)

(72) Inventors: Yanhua Wan, Shenzhen (CN); Wei Zhang, Shenzhen (CN); Jian Wang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 117 days.

(21) Appl. No.: 14/902,833

(22) PCT Filed: Apr. 14, 2014

(86) PCT No.: PCT/CN2014/075310
§ 371 (c)(1),
(2) Date: Jan. 4, 2016

(87) PCT Pub. No.: WO2014/169797
PCT Pub. Date: Oct. 23, 2014

(65) Prior Publication Data
US 2016/0173482 A1    Jun. 16, 2016

(30) Foreign Application Priority Data
Jul. 5, 2013   (CN) .......................... 2013 1 0281816

(51) Int. Cl.
*G06F 21/36* (2013.01)
*H04L 29/06* (2006.01)
(Continued)

(52) U.S. Cl.
CPC ........ *H04L 63/083* (2013.01); *H04L 41/0889* (2013.01); *H04L 63/0884* (2013.01);
(Continued)

(58) Field of Classification Search
CPC ............................... H04L 63/083; H04L 63/10
(Continued)

(56) References Cited

U.S. PATENT DOCUMENTS

| 7,590,075 B2 * | 9/2009 | Pirzada | H04W 88/00 370/254 |
| 8,026,814 B1 * | 9/2011 | Heinze | G06Q 10/06 340/10.1 |

(Continued)

FOREIGN PATENT DOCUMENTS

| CN | 101494769 A | 7/2009 |
| CN | 102096985 A | 6/2011 |

(Continued)

OTHER PUBLICATIONS

International Search Report (Form PCT/ISA/210) for International Application No. PCT/CN2014/075310 dated Jul. 4, 2014, p. 1.

(Continued)

*Primary Examiner* — Haresh N Patel
(74) *Attorney, Agent, or Firm* — Koppel, Patrick, Heybl & Philpott

(57) ABSTRACT

The invention discloses a CU login method and system. The method is applied to a multi-platform interconnection and intercommunication VSS based on a structure of Wireless Mesh Network, the method includes: management information of a docking platform is configured in an access platform, and a shared channel is configured for the access platform in the docking platform; and the access platform acquires the management information of the docking platform after receiving a request of logging in the docking platform from a CU, and initiates a CU login process to the docking platform according to the management information. By the technical solutions of the disclosure, the CU may not only log in the local platform but also log in any platform in (Continued)

the system through the local platform more conveniently and rapidly.

14 Claims, 4 Drawing Sheets

(51) Int. Cl.
*H04W 12/06* (2009.01)
*H04L 12/24* (2006.01)
*H04N 7/18* (2006.01)
*H04W 84/18* (2009.01)

(52) U.S. Cl.
CPC ............ *H04L 63/10* (2013.01); *H04N 7/181* (2013.01); *H04W 12/06* (2013.01); *H04L 41/28* (2013.01); *H04W 84/18* (2013.01)

(58) Field of Classification Search
USPC .......................................................... 726/7
See application file for complete search history.

(56) References Cited

U.S. PATENT DOCUMENTS

| | | | |
|---|---|---|---|
| 8,239,925 B2 | 8/2012 | Faitelson et al. | |
| 8,260,916 B2 * | 9/2012 | Frietsch | H04L 12/56 709/222 |
| 2003/0084350 A1 * | 5/2003 | Eibach | H04L 63/08 726/4 |
| 2005/0246248 A1 * | 11/2005 | Vesuna | G06K 7/0008 705/28 |
| 2007/0079042 A1 * | 4/2007 | Crosswy | G06F 1/1632 710/303 |
| 2009/0049554 A1 * | 2/2009 | Vuong | H04L 67/1095 726/26 |
| 2009/0271517 A1 * | 10/2009 | Naylor | H04L 69/28 709/227 |
| 2010/0138582 A1 * | 6/2010 | Bird | H04L 65/60 710/303 |
| 2012/0151403 A1 * | 6/2012 | Bhogal | G06F 3/1431 715/778 |
| 2014/0028462 A1 * | 1/2014 | Lawson | G08C 17/02 340/870.01 |
| 2014/0211801 A1 * | 7/2014 | Trainin | H04W 8/26 370/392 |

FOREIGN PATENT DOCUMENTS

| | | |
|---|---|---|
| EP | 1408657 A1 | 4/2004 |
| WO | WO 2012116033 A1 | 8/2012 |

OTHER PUBLICATIONS

2012 International Conference on Computer Science and Electronics Engineering article titled, "Video Monitoring Communication System Design Based on Wireless Mesh Networks" by Liuqing Yang.

* cited by examiner

METHOD AND SYSTEM FOR CU LOGGING IN DOCKING PLATFORM

TECHNICAL FIELD

The disclosure relates to the technical field of computers, and in particular to a Client Unit (CU) login method and system.

BACKGROUND

In recent years, a market share of Video Surveillance System (VSS) products constantly increases, and more and more urgent requirements on interconnection and intercommunication among multiple different platforms are made. For example, Jiangsu Telecommunication establishes a video surveillance platform in the whole province, Jiangsu Ministry of Public Security independently establishes a set of video surveillance platform, Jiangsu Ministry of Public Security intends to open video contents of traffic crossroads in a public security system to the video surveillance platform of Jiangsu Telecommunication and provide them for public users to view. Meanwhile Jiangsu Ministry of Public Security also wants Jiangsu Telecommunication to open video surveillance points to the public security system. During a practical application, there are many similar requirements, and in order to meet these user requirements, it is necessary to make related improvements in a VSS system to meet such interconnection and intercommunication requirements.

In the prior art, a universal manner for interconnection and intercommunication between platforms is to add an intercommunication gateway unit to a boundary of each platform to implement interconnection and intercommunication with an external system, and in such a manner, relative independence and stability of an internal system of each platform may be ensured. However, such a processing manner has a problem as follows: one platform may be docked with multiple platforms, different protocols may be adopted for docking by different platforms, then it is necessary to deploy multiple intercommunication gateway units when the platforms are docked, and when the platforms form complex interconnection relationships, a system becomes extraordinarily large and complex, it is hard to configure each network element, and cost is greatly increased.

In consideration of the abovementioned practical condition, a multi-platform interconnection and intercommunication VSS based on a Wireless Mesh Network structure is provided, a manner for networking among multiple platforms adopts mesh networking, multicast and unicast manners are adopted for communication among the platforms, multicast is mainly configured for mutual discovery among the platforms, and unicast is mainly configured for end-to-end communication among the platforms, so that intercommunication gateways may be eliminated, network elements for networking may be greatly reduced, complexity and cost of the system may be reduced, and in addition, great convenience may be brought to configuration.

However, in the abovementioned mesh structure-based multi-platform interconnection and intercommunication VSS, if an existing CU wants to access channel information of an external system, it may only query a docking platform sequentially through a local platform, an intercommunication gateway of the local platform and an intercommunication platform of the docking platform, and a query result is returned to the CU sequentially through these network elements, so that the flow is extremely complex, and configuration of each network element is extremely tedious.

SUMMARY

Embodiments of the disclosure provide a CU login method and system, so as to solve the problem or at least partially solve the problem.

One embodiment of the disclosure provides a CU login method, which is applied to a multi-platform interconnection and intercommunication VSS based on a structure of a wireless mesh network, the method including:

management information of a docking platform is configured in an access platform, and a shared channel is configured for the access platform in the docking platform; and the access platform acquires the management information of the docking platform after receiving a request of logging in the docking platform from a CU, and initiates a CU login process to the docking platform according to the management information.

Preferably, the step that the management information of the docking platform is configured in the access platform may specifically include:

the management information of the docking platform is configured in an Operation Maintenance Module (OMM) portal of the access platform, wherein the management information includes: a username and password required by access to the docking platform, a name of the docking platform, an Internet Protocol (IP) address of the docking platform and a platform Identifier (ID) of the docking platform.

Preferably, the step that the shared channel is configured, in the docking platform, for the access platform may specifically include:

the shared channel is configured, in an OP (a web portal, responsible for managing related information of a certain PU) portal of the docking platform, for the access platform, right control is performed on the shared channel, the shared channel is renumbered according to a requirement of the docking platform, and a Global Unique Identifier (GUID) number of the access platform is mapped into a number required by the docking platform.

Preferably, the step that the access platform acquires the management information of the docking platform after receiving the request of logging in the docking platform from the CU, and initiates the CU login process to the docking platform according to the management information may specifically include:

the CU sends a register request message to the access platform, the register request message containing: a Client Unit Identifier (CUID) of the access platform, a username and password of the access platform and a platform ID of the docking platform;

the access platform analyzes the register request message, calls an authentication storage process to acquire Register Manager System (RGM) information of the access platform, and initiates a login message requesting to login a docking platform to an RGM of the access platform after determining that the CU is intended to initiate login to the docking platform according to the RGM information, the login message containing the CUID of the access platform and the platform ID of the docking platform;

the RGM of the access platform searches the management information to acquire a username and password of the docking platform and the IP address of the docking platform according to the platform ID in the login message after receiving the login message, and initiates a login request to the docking platform according to the acquired information and the CUID;

the docking platform calls the authentication storage process after receiving the login request, and sends information returned after authentication succeeds to the CU through the corresponding access platform;

the access platform sends an online request message of the CU to the docking platform; and the docking platform modifies a state and username in a CU list in a database according to the online request message, and sends an online success response message to the CU through the access platform.

Preferably, the method may further include:

after the CU successfully logs in the docking platform, the access platform sends a PU list refreshing request message sent by the CU to the docking platform; and the docking platform queries the database after receiving the PU list refreshing request message, assembles a query result into an Extensible Markup Language (XML) message, and forwards the XML message to the CU through the access platform.

Preferably, the method may further include:

the CU periodically sends a keep-alive message to the docking platform through the access platform; and the docking platform determines that the CU has been offline if not receiving the keep-alive message sent by the CU within three keep-alive periods, deletes the CU list in the database, and sends a response message to the CU through the access platform.

Preferably, the method may further include:

the CU sends an offline message to the docking platform through the access platform; and the docking platform deletes the CU list in the database after receiving the offline message, and sends a response message to the CU through the access platform.

Preferably, the method may further include:

after receiving the request of logging in the access platform from the CU, the access platform analyzes the request, calls the authentication storage process, and sends information returned after authentication succeeds to the CU; and the access platform receives the online request message initiated by the CU, modifies the state and username in the CU list in the database according to the online request message, and sends an online success message to the CU.

The embodiment of the disclosure further provides a CU login system, which is applied to a multi-platform interconnection and intercommunication VSS based on structure of Wireless Mesh Network, the system including:

a configuration element configured to configure, in an access platform, management information of a docking platform, and configure, in the docking platform, a shared channel to the access platform; and a login element including the access platform and the docking platform, wherein the access platform is configured to acquire the management information of the docking platform after receiving a request of logging in the docking platform from a CU, and initiate a CU login process to the docking platform according to the management information; and the docking platform is configured to cooperate with the access platform for the CU login process.

Preferably, the configuration element may specifically be configured to:

configure the management information of the docking platform in an OMM portal of the access platform, wherein the management information includes: a username and password required by access to the docking platform, a name of the docking platform, an IP address of the docking platform and a platform ID of the docking platform; and configure the shared channel to the access platform in an OP portal of the docking platform, perform right control on the shared channel, renumber the shared channel according to a requirement of the docking platform, and map a GUID number of the access platform is mapped into a number required by the docking platform.

Preferably, the access platform may specifically be configured to: receive a register request message sent by the CU, the register request message containing: a CUID of the access platform, a username and password of the access platform and the platform ID of the docking platform; analyze the register request message, call an authentication storage process to acquire RGM information of the access platform, and initiate a login message requesting to login a docking platform to an RGM of the access platform after determining that the CU is intended to initiate login to the docking platform according to the RGM information, the login message containing the CUID of the access platform and the platform ID of the docking platform; and search the management information to acquire a username and password of the docking platform and the IP address of the docking platform according to the platform ID in the login message through the RGM, and initiate a login request to the docking platform according to the acquired information and the CUID;

the docking platform may specifically be configured to: call the authentication storage process after receiving the login request, and send information returned after authentication succeeds to the CU through the corresponding access platform;

the access platform may specifically be configured to: send an online request message of the CU to the docking platform; and the docking platform may specifically be configured to: modify a state and username in a CU list in a database according to the online request message, and send an online success response message to the CU through the access platform.

Preferably, the access platform may be configured to: after the CU successfully logs in the docking platform, send a PU list refreshing request message sent by the CU to the docking platform; and the docking platform may be configured to: query the database after receiving the PU list refreshing request message, assemble a query result into an XML message, and forward the XML message to the CU through the access platform.

Preferably, the docking platform may be configured to:

determine that the CU has been offline if not receiving the keep-alive message sent by the CU through the access platform within three keep-alive periods, delete the CU list in the database, and send a response message to the CU through the access platform.

Preferably, the docking platform may be configured to:

delete the CU list in the database after receiving the offline message sent by the CU through the access platform, and send a response message to the CU through the access platform.

Preferably, the access platform may be configured to:

after receiving the request of logging in the access platform from the CU, analyze the request, call the authentication storage process, and send information returned after authentication succeeds to the CU; and receive the online request message initiated by the CU, modify a state and username in the CU list in the database according to the online request message, and send an online success message to the CU.

The embodiment of the disclosure has beneficial effects as follows:

by the technical solutions of the embodiment of the disclosure, the problem that a CU may not directly log in an external platform in a mesh-structure-based multi-platform interconnection and intercommunication VSS in the related art is solved, and the CU may not only log in the platform but also log in any platform in the system through the platform more conveniently and rapidly.

The above is only the summary of the technical solutions of the disclosure, the technical solutions of the disclosure may be implemented according to contents of the specification for clearer understanding, and in order to make characteristics and advantages of the disclosure more obvious and easier to understand, specific implementation modes of the disclosure are described below.

BRIEF DESCRIPTION OF THE DRAWINGS

By reading detailed description made about preferred implementation modes below, those skilled in the art may understand various other advantages and benefits more clearly. The drawings are only adopted to illustrate the preferred implementation modes and not intended to limit the disclosure. Moreover, in the whole drawings, the same reference symbols represent the same parts. In the drawings.

DETAILED DESCRIPTION OF THE EMBODIMENTS

Exemplary embodiments of the disclosure will be described below with reference to the drawings in more detail. Although the drawings show the exemplary embodiments of the disclosure, it should be understood that the disclosure may be implemented by various forms rather than being limited by the embodiments described here. Instead, providing these embodiments is to make the disclosure understood more thoroughly and completely show the scope of the disclosure to those skilled in the art.

At present, if an existing CU wants to access channel information of an external system, it may only query a docking platform sequentially through a local platform, an intercommunication gateway of the local platform and an intercommunication platform of the docking platform, and a query result is returned to the CU sequentially through these network elements, so that the flow is extremely complex, and configuration of each network element is extremely tedious. In order to solve the problem that a CU may not directly log in an external platform in a mesh-structure-based multi-platform interconnection and intercommunication VSS in the related art, the disclosure provides a CU login method and system, which are implemented on the basis of the mesh-structure-based multi-platform interconnection and intercommunication VSS. By the technical solution provided by the disclosure, a CU may not only log in the local platform but also log in any platform in the system through the local platform more conveniently and rapidly. If the CU wants to access channel information of a certain external system, a forwarding flow of an intercommunication gateway of the local platform and an intercommunication gateway of a docking platform in an original manner may completely be eliminated, the CU may directly query the docking platform through the local platform, and then a query result is returned to the CU through the local platform, so that the flow is simplified, and complexity in configuration is also reduced. The disclosure is further described below with reference to the drawings and embodiments in detail. It should be understood that the specific embodiments described here are only adopted to explain the disclosure and not intended to limit the disclosure.

Method Embodiment

Figure 1:
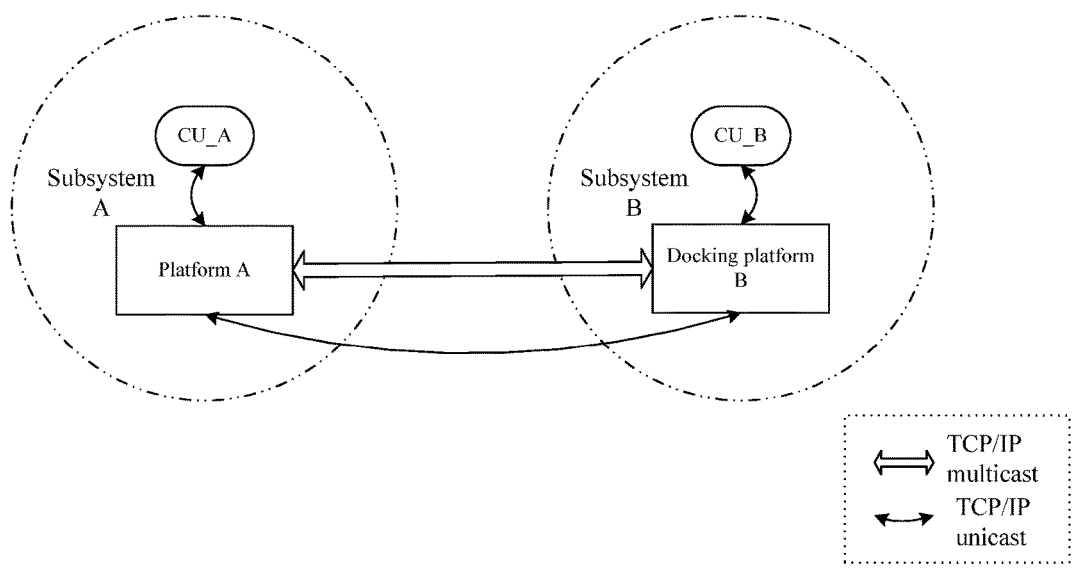
FIG. 1 is a schematic diagram of a mesh-structure-based multi-platform interconnection and intercommunication VSS according to an embodiment of the disclosure.

According to an embodiment of the disclosure, a CU login method is provided, which is applied to a mesh-structure-based multi-platform interconnection and intercommunication VSS. FIG. 1 is a schematic diagram of a mesh-structure-based multi-platform interconnection and intercommunication VSS according to an embodiment of the disclosure. As shown in FIG. 1, in the mesh-structure-based multi-platform interconnection and intercommunication VSS, a manner for communication among platforms adopts multicast and unicast manners, multicast is mainly configured for mutual discovery among the platforms, unicast is mainly configured for end-to-end communication among the platforms, and CUs belonging to the same platform may log in any platform in the system to acquire PU list information for a series of operation such as real-time video browsing, image recording and pan-tilt-zoom control through the platform.

Figure 2:
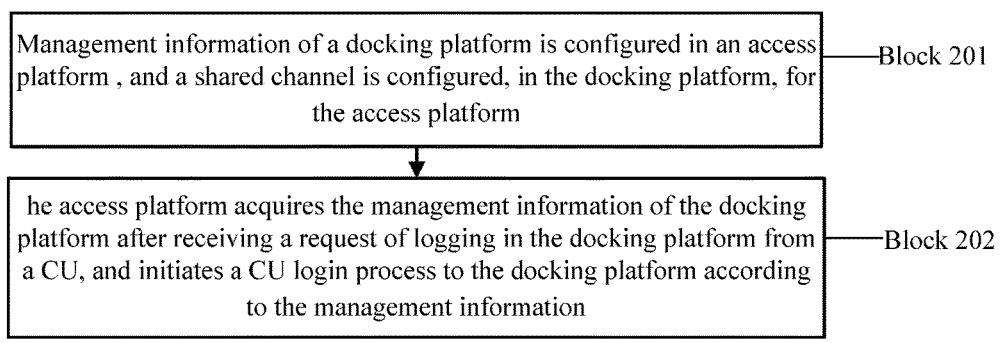
FIG. 2 is a flowchart of a CU login method according to an embodiment of the disclosure.

FIG. 2 is a flowchart of a CU login method according to an embodiment of the disclosure. As shown in FIG. 2, a CU login method according to the embodiment of the disclosure includes the following processing.

In block 201: management information of a docking platform (also called a docking platform B) is configured in an access platform (also called a platform A), and a shared channel is configured, in the docking platform, for the access platform.

In block 201, the block that the management information of the docking platform is configured in the access platform specifically includes:

the management information of the docking platform is configured in an OMM portal of the access platform, wherein the management information includes: a username and password required by access to the docking platform, a name of the docking platform, an IP address of the docking platform and a platform ID of the docking platform.

During a practical application, the management information of the docking platform B, which is required to be manually configured in the OMM portal of the platform A when the management information of the docking platform B is configured, includes: basic information such as a username and password required by platform access and a name of the docking platform. The IP address and global unique platform ID of the docking platform B are not required to be configured, and they are automatically generated when the platform joins the multicast system, and are stored in the local platform.

In block 201, the block that the shared channel is configured, in the docking platform, for the access platform specifically includes:

the shared channel is configured, in an OP portal of the docking platform, for the access platform, right control is performed on the shared channel, the shared channel is renumbered according to a requirement of the docking platform, and a GUID number of the access platform is mapped into a number required by the docking platform.

In block 202: the access platform acquires the management information of the docking platform after receiving a request of logging in the docking platform from a CU, and initiates a CU login process to the docking platform according to the management information.

In block 202, the following processing is performed.

The CU sends a register request message to the access platform, the register request message containing: a CUID of the access platform, a username and password of the access platform and the platform ID of the docking platform;

The access platform analyzes the register request message, calls an authentication storage process to acquire RGM information of the access platform, and initiates a message requesting to login a docking platform to an RGM of the access platform after determining that the CU is intended to initiate login to the docking platform according to the RGM information, the login message containing a CUID of the access platform and a platform ID of the docking platform;

the RGM of the access platform searches the management information for a username and password of the docking platform and an IP address of the docking platform according to the platform ID in the message requesting to login the docking platform after receiving the message requesting to login the docking platform, and initiates a login request to the docking platform according to the searched information and the CUID;

the docking platform calls the authentication storage process after receiving the login request, and sends information returned after authentication succeeds to the CU through the corresponding access platform;

the access platform sends an online request message of the CU to the docking platform; and the docking platform modifies a state and username in a CU list in a database according to the online request message, and sends a online success response message to the CU through the access platform.

After the abovementioned processing is executed, the following processing may further be executed:

after the CU successfully logs in the docking platform, the access platform sends a PU list refreshing request message sent by the CU to the docking platform; and the docking platform queries the database after receiving the PU list refreshing request message, assembles a query result into an XML message, and forwards the XML message to the CU through the access platform.

Preferably, in the embodiment of the disclosure, the CU may periodically send a keep-alive message to the docking platform through the access platform; and the docking platform determines that the CU has been offline if not receiving the keep-alive message sent by the CU within three keep-alive periods, deletes the CU list in the database, and sends a response message to the CU through the access platform.

When the CU needs to logoff, the CU sends an offline message to the docking platform through the access platform; and the docking platform deletes the CU list in the database after receiving the offline message, and sends a response message to the CU through the access platform.

If the CU needs to access the access platform, after receiving a request of logging in the access platform from the CU, the access platform analyzes the request, calls the authentication storage process, and sends information returned after authentication succeeds to the CU; and the access platform receives an online request message initiated by the CU, modifies a state and username in the CU list in the database according to the online request message, and sends an online success message to the CU.

The abovementioned technical solution of the embodiment of the disclosure is described below with reference to the drawings in detail.

Figure 3:
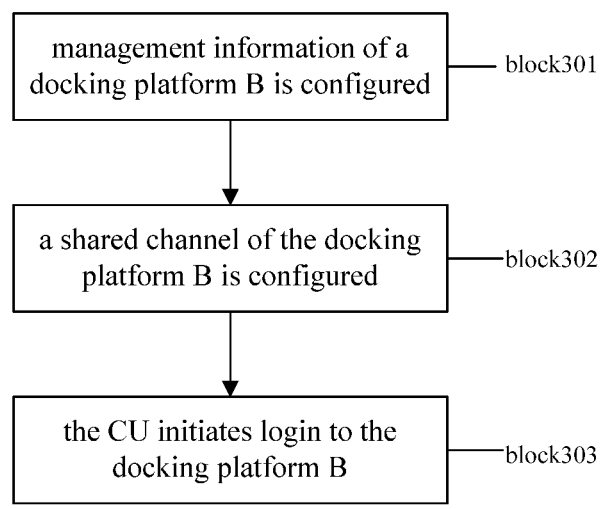
FIG. 3 is an overall flowchart of CU login according to an embodiment of the disclosure.
Figure 4:
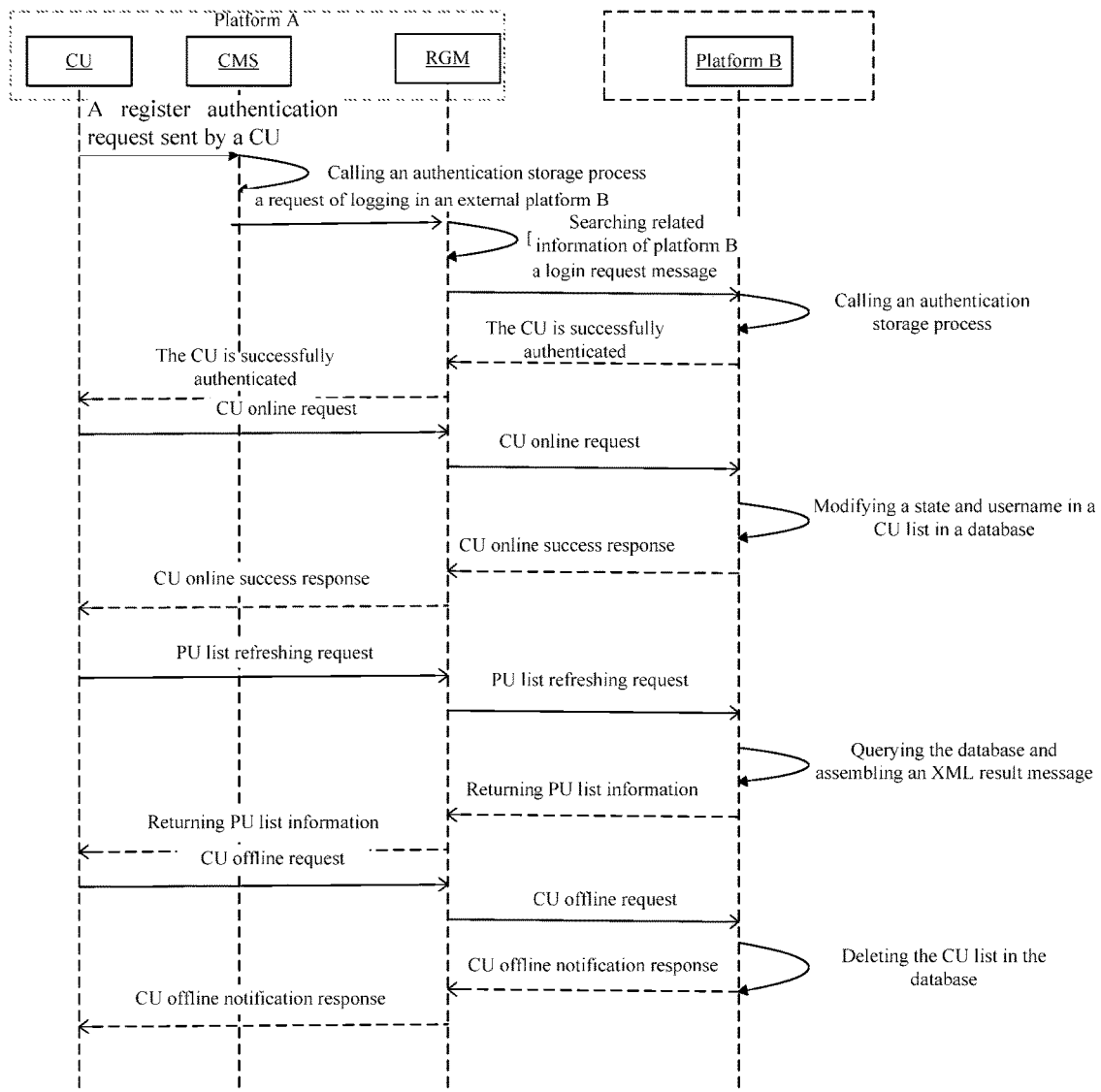
FIG. 4 is a detailed signalling flowchart of CU login according to an embodiment of the disclosure.

FIG. 3 is an overall flowchart of CU login according to an embodiment of the disclosure, and FIG. 4 is a detailed signalling flowchart of CU login according to an embodiment of the disclosure. As shown in FIG. 3 and FIG. 4, the following process is included.

In block 301: management information of a docking platform B is configured.

The management information of the docking platform B is configured in an OMM portal of a platform A, only basic information such as a username, a password and a name of the docking platform required by platform access is required to be configured in the platform A, an IP address and global unique platform ID of the docking platform are automatically generated when the platform joins the multicast system, and are stored in the platform, and all the information is necessary for a CU to log in the docking platform B through the platform A.

In block 302: a shared channel of the docking platform B is configured.

The shared channel is configured in an OP portal of the docking platform B, the shared channel is shared to the platform A, and related right control is performed when the shared channel is shared. In addition, when the shared channel is shared, the shared channel is required to be renumbered according to a requirement of the docking platform B, and a GUID number of the platform A in the system is mapped to a number required by the docking platform B.

In block 303: the CU initiates login to the docking platform B.

The block 303 specifically includes the following processing:

In block 3031: the CU sends a register request message to a Content Manager System (CMS) module of the platform A, wherein the register request message contains a CUID, the username, the password and the platform ID of the docking platform B, and the platform ID may be filled with 0 if the CU directly logs in the platform A.

In block 3032: the CMS receives the register request message of the CU, analyzes the register request message, and calls an authentication storage process, a result returned by the authentication storage process including information of the platform A, such as a Content Distribution Network (CDN) IP address, a CDN port, an RGM IP address and an RGM port.

In block 3033: the CMS initiates a message requesting to log in an external platform to the RGM when acquiring the RGM information of the platform A by the authentication storage process and discovering the CU is intended to log in the docking platform B, the message requesting to log in the external platform including the CUID and the platform ID of the docking platform B. If the CU directly logs in the platform A, the CMS forwards the message returned by the authentication storage process to the CU, and the CU sends an online request to the RGM.

In block 3034: the RGM searches the stored management information of the docking platform according to the platform ID in the message requesting to log in the external platform after receiving the message requesting to log in the external platform from the CMS, searched information including the username, password and IP address of the docking platform B, and then initiates login to the docking platform through the information and the CUID.

In block 3035: the docking platform B calls the authentication storage process according to the received information such as the username and the password after receiving the message requesting to log in the external platform. The authentication storage process returns the information of the docking platform B such as the RGM IP address and the RGM port. The docking platform B forwards the information to the CU through the platform A.

In block 3036: the CU sends an online request message to the docking platform B through the platform A after successful authentication, and the docking platform B modifies a state and username in a CU list in a database after receiving the online request message of the CU, and returns an online success response message to the CU through the platform A.

In block 3037: the CU initiates a PU list refreshing request message to the docking platform B through the platform A after receiving the online success response message, and the docking platform queries the database after receiving the PU list refreshing request message, assembles a query result into an XML message, and forwards the XML message to the CU through the platform A.

In block 3038: the CU periodically sends a keep-alive message to the docking platform B, and the docking platform B determines that the CU has been offline if not receiving the keep-alive message of the CU within 3 keep-alive periods, deletes the memory list of the CU in the database and simultaneously returns a response message to the CU; and In block 3039: the CU sends an offline message to the docking platform B, and the docking platform B deletes the memory list of the CU in the database after receiving the offline message of the CU, and simultaneously returns a response message to the CU.

From the above, by the technical solutions of the embodiment of the disclosure, the CU may not only log in the local platform but also log in any platform in the system through the platform to acquire a PU list for a series of operation such as real-time video browsing, image recording and pan-tilt-zoom control through the platform. If the CU wants to access channel information of a certain external platform, a forwarding flow of an intercommunication gateway of the platform and an intercommunication gateway of a docking platform in the related art may completely be eliminated, the CU may directly query the docking platform through the local platform, and then a query result is returned to the CU through the local platform, so that the flow is simplified, and complexity in configuration is also reduced.

System Embodiment

Figure 5:
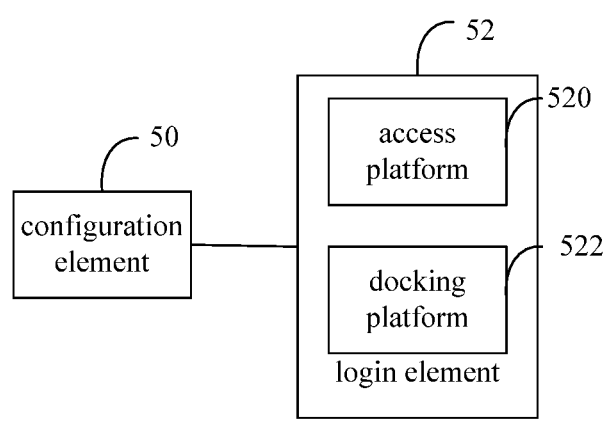
FIG. 5 is a structure diagram of a CU login system according to an embodiment of the disclosure.

According to an embodiment of the disclosure, a CU login system is provided, which is configured into a mesh-structure-based multi-platform interconnection and intercommunication VSS. FIG. 5 is a structure diagram of a CU login system according to an embodiment of the disclosure. As shown in FIG. 5, the CU login system according to the embodiment of the disclosure includes: a configuration element 50 and a login element 52, wherein the login element 52 specifically includes: an access platform 520 and a docking platform 522. Each component of the embodiment of the disclosure is described below in detail.

The configuration element 50 is configured to configure, in the access platform 520, management information of the docking platform 522, and configure, in the docking platform 522, a shared channel to the access platform 520.

The configuration element 50 is specifically configured to:

configure the management information of the docking platform 522 in an OMM portal of the access platform 520, wherein the management information includes: a username and password required by access to the docking platform 522, the name of the docking platform 522, an IP address of the docking platform 522 and a platform ID of the docking platform 522; and configure, in an OP portal of the docking platform 522, the shared channel to the access platform 520, perform right control on the shared channel, renumber the shared channel according to a requirement of the docking platform 522, and map a GUID number of the access platform 520 into a number required by the docking platform.

The login element 52 includes the access platform 520 and the docking platform 522.

The access platform 520 is configured to acquire the management information of the docking platform 522 after receiving a request of logging in the docking platform 522 from a CU, and initiate a CU login process to the docking platform 522 according to the management information.

The docking platform 522 is configured to cooperate with the access platform 520 for the CU login process.

Specifically, the access platform 520 is specifically configured to: receive a register request message sent by the CU, the register request message containing: a CUID of the access platform 520, a username and password of the access platform 520 and the platform ID of the docking platform 522; analyze the register request message, call an authentication storage process to acquire RGM information of the access platform, and initiate a login message requesting to log in the docking platform 522 to an RGM of the access platform after determining that the CU is intended to initiate login to the docking platform 522 according to the RGM information, the login message requesting to log in the docking platform 522 containing the CUID of the access platform 520 and the platform ID of the docking platform 522; and search the management information for a username and password of the docking platform 522 and the IP address of the docking platform 522 according to the platform ID in the login message through the RGM, and initiate a login request to the docking platform 522 according to the acquired information and the CUID.

The docking platform 522 is specifically configured to: call the authentication storage process after receiving the login request, and send information returned after authentication succeeds to the CU through the corresponding access platform 520.

The access platform 520 is specifically configured to: send an online request message of the CU to the docking platform 522.

The docking platform 522 is specifically configured to: modify a state and username in a CU list in a database according to the online request message, and send an online success response message to the CU through the access platform 520.

In addition, the access platform 520 is further configured to: after the CU successfully logs in the docking platform, send a PU list refreshing request message sent by the CU to the docking platform 522.

The docking platform 522 is further configured to: query the database after receiving the PU list refreshing request message, assemble a query result into an XML message, and forward the XML message to the CU through the access platform 520; determine that the CU has been offline if not receiving a keep-alive message sent by the CU through the access platform 520 within three keep-alive periods, delete the CU list in the database, and send a response message to the CU through the access platform 520; and delete the CU list in the database after receiving an offline message sent by the CU through the access platform 520, and send a response message to the CU through the access platform 520.

When a user needs to log in the access platform 520, the access platform 520 is further configured to:

after receiving a request of logging in the access platform from the CU, analyze the request of logging in the access platform, call the authentication storage process, and send information returned after authentication succeeds to the CU; and receive the online request message initiated by the CU, modify the state and username in the CU list in the database according to the online request message, and send an online success message to the CU.

From the above, by the technical solutions of the embodiment of the disclosure, the CU may not only log in the access platform but also log in any platform in the system through the access platform to acquire a PU list for a series of operation such as real-time video browsing, image recording and pan-tilt-zoom control through the access platform. If the CU wants to access channel information of a certain external platform, a forwarding flow of an intercommunication gateway of the platform and an intercommunication gateway of a docking platform in the related art may completely be eliminated, the CU may directly query the docking platform through the access platform, and then a query result is returned to the CU through the access platform, so that the flow is simplified, and complexity in configuration is also reduced.

Obviously, those skilled in the art may make various modifications and variations without departing from the spirit and scope of the disclosure. Thus, if these modifications and variations of the disclosure are within scopes of claims of the disclosure and equivalent technologies, the disclosure is intended to include these modifications and variations.

INDUSTRIAL APPLICABILITY

From the above, the CU login method and system provided by the embodiment of the disclosure have beneficial effects as follows: a CU may not only log in a local platform but also log in any platform in a system through the local platform to acquire a PU list for a series of operation such as real-time video browsing, image recording and pan-tilt-zoom control through the local platform. If the CU wants to access channel information of a certain external platform, a forwarding flow of an intercommunication gateway of the platform and an intercommunication gateway of a docking platform in the related art may completely be eliminated, the CU may directly query the docking platform through the local platform, and then a query result is returned to the CU through the local platform, so that the flow is simplified, and complexity in configuration is also reduced.

What is claimed is:

1. A Client Unit (CU) login method, applied to a multi-platform interconnection and intercommunication Video Surveillance System (VSS) based on a structure of a Wireless Mesh Network, comprising:
   multi-platform interconnection and intercommunication Video Surveillance System (VSS) configuring, in an access platform, management information of a docking platform, and configuring, in the docking platform, a shared channel for the access platform; and
   after receiving a request of logging in the docking platform from a CU, the access platform acquiring the management information of the docking platform, and initiating a CU login process to the docking platform according to the management information,
   wherein said multi-platform interconnection and intercommunication Video Surveillance System VSS configuring, in the docking platform, the shared channel for the access platform comprises:
   the multi-platform interconnection and intercommunication Video Surveillance System (VSS) configuring, in an OP portal of the docking platform, the shared channel for the access platform, performing right control on the shared channel, renumbering the shared channel according to a requirement of the docking platform, and mapping a Global Unique Identifier (GUID) number of the access platform into a number required by the docking platform.

2. The method according to claim 1, wherein said multi-platform interconnection and intercommunication Video Surveillance System (VSS) configuring, in the access platform, the management information of the docking platform comprises:
   the multi-platform interconnection and intercommunication Video Surveillance System (VSS) configuring, in an Operation Maintenance Module (OMM) portal of the access platform, the management information of the docking platform, wherein the management information comprises: a username and password required by access to the docking platform, a name of the docking platform, an Internet Protocol (IP) address of the docking platform and a platform Identifier (ID) of the docking platform.

3. The method according to claim 1, wherein after receiving the request of logging in the docking platform from the CU, said the access platform acquiring the management information of the docking platform, and initiating the CU login process to the docking platform according to the management information comprises:
   sending, by the CU, a register request message to the access platform, the register request message containing a Client Unit Identifier (CUID) of the access platform, a username and password of the access platform and a platform ID of the docking platform;
   the access platform analyzing the register request message, calling an authentication storage process to acquire Register Manager System (RGM) information of the access platform, and initiating a login message requesting to log in a docking platform to the RGM of the access platform after determining that the CU is intended to initiate login to the docking platform according to the RGM information, the login message containing the CUID of the access platform and the platform ID of the docking platform;
   the RGM of the access platform searching the management information for a username and password of the docking platform and the IP address of the docking platform according to the platform ID in the login message after receiving the login message, and initiating a login request to the docking platform according to the acquired information and the CUID;

the docking platform calling the authentication storage process after receiving the login request, and sending information returned after authentication succeeds to the CU through the access platform to which the CU belongs;

sending, by the access platform, an online request message of the CU to the docking platform; and the docking platform modifying a state and username in a CU list in a database according to the online request message, and sending, by the docking platform, an online success response message to the CU through the access platform.

4. The method according to claim 1, further comprising:
after the CU successfully logs in the docking platform, sending, by the access platform, a preunit list refreshing request message sent by the CU to the docking platform; and the docking platform querying the database after receiving the PU list refreshing request message, assembling a query result into an Extensible Markup Language (XML) message, and forwarding the XML message to the CU through the access platform.

5. The method according to claim 1, further comprising:
periodically sending, by the CU, a keep-alive message to the docking platform through the access platform; and the docking platform determining, that the CU is offline based on that the docking platform does not receive the keep-alive message sent by the CU within three keep-alive periods, deleting a CU list in the database, and sending a response message to the CU through the access platform.

6. The method according to claim 1, further comprising:
sending, by the CU, an offline message to the docking platform through the access platform; and the docking platform deleting the CU list in the database after receiving the offline message, and sending a response message to the CU through the access platform.

7. The method according to claim 1, further comprising:
after receiving the request of logging in the access platform from the CU, the access platform analyzing the request of logging in the access platform, calling the authentication storage process, and sending information returned after authentication succeeds to the CU; and the access platform receiving the online request message initiated by the CU, modifying the state and username in the CU list in the database according to the online request message, and sending an online success message to the CU.

8. A Client Unit (CU) login system, which is applied to a multi-platform interconnection and intercommunication Video Surveillance System (VSS) based on a structure of a Wireless Mesh Network, wherein the system comprises:

a hardware processor, configured to perform programming components stored in a memory, wherein the programming components comprise:

a configuration element to configure, in an access platform, management information of a docking platform, and configure, in the docking platform, a shared channel for the access platform; and a login element comprising the access platform and the docking platform, wherein the access platform is to acquire the management information of the docking platform after receiving a request of logging in the docking platform from a CU, and initiate a CU login process to the docking platform according to the management information; and the docking platform is to cooperate with the access platform for the CU login process, wherein the configuration element is to configure, in an OP portal of the docking platform, the shared channel to the access platform, perform right control on the shared channel, renumber the shared channel according to a requirement of the docking platform, and map a Global Unique Identifier (GUID) number of the access platform into a number required by the docking platform.

9. The system according to claim 8, wherein the configuration element is further to:

configure, in an Operation Maintenance Module (OMM) portal of the access platform, the management information of the docking platform, wherein the management information comprises: a username and password required by access to the docking platform, a name of the docking platform, an Internet Protocol (IP) address of the docking platform and a platform Identifier (ID) of the docking platform.

10. The system according to claim 8, wherein the access platform is to: receive a register request message sent by the CU, the register request message containing: a Client Unit Identifier (CUID) of the access platform, a username and password of the access platform and the platform ID of the docking platform; analyze the register request message, call an authentication storage process to acquire Register Manager System (RGM) information of the access platform, and initiate a login message requesting to log in the docking platform to an RGM of the access platform after determining that the CU is intended to initiate login to the docking platform according to the RGM information, the login message containing the CUID of the access platform and the platform ID of the docking platform; and search the management information for a username and password of the docking platform and the IP address of the docking platform according to the platform ID in the login message through the RGM, and initiate a login request to the docking platform according to the acquired information and the CUID;

the docking platform is to: call the authentication storage process after receiving the login request, and send information returned after authentication succeeds to the CU through the access platform to which the CU belongs;

the access platform is to: send an online request message of the CU to the docking platform; and the docking platform is to: modify a state and username in a CU list in a database according to the online request message, and send an online success response message to the CU through the access platform.

11. The system according to claim 8, wherein the access platform is further to: after the CU successfully logs in the docking platform, send a preunit list refreshing request message sent by the CU to the docking platform; and the docking platform is further to: query the database after receiving the PU list refreshing request message, assemble a query result into an Extensible Markup Language (XML) message, and forward the XML message to the CU through the access platform.

12. The system according to claim 8, wherein the docking platform is further to:

determine that the CU is offline if not receiving the keep-alive message sent by the CU through the access platform within three keep-alive periods, delete the CU list in the database, and send a response message to the CU through the access platform.

13. The system according to claim 8, wherein the docking platform is further to:
delete the CU list in the database after receiving the offline message sent by the CU through the access platform, and send a response message to the CU through the access platform.

14. The system according to claim 8, wherein the access platform is further to:
after receiving the request of logging in the access platform from the CU, analyze the request of logging in the access platform, call the authentication storage process, and send information returned after authentication succeeds to the CU; and
receive the online request message initiated by the CU, modify a state and username in the CU list in the database according to the online request message, and send an online success message to the CU.

* * * * *